(12) United States Patent
Kendrick

(10) Patent No.: US 6,175,300 B1
(45) Date of Patent: Jan. 16, 2001

(54) BLIND SPOT VIEWING SYSTEM

(76) Inventor: Byron K. Kendrick, 4891 N. Ritter Ave., Indianapolis, IN (US) 46226

(*) Notice: Under 35 U.S.C. 154(b), the term of this patent shall be extended for 0 days.

(21) Appl. No.: 09/146,492

(22) Filed: Sep. 3, 1998

(51) Int. Cl.$^7$ .................................................. B60Q 1/00
(52) U.S. Cl. ......................... 340/436; 340/435; 340/903; 340/937; 348/148
(58) Field of Search ................... 340/435, 436, 340/903, 937; 348/113, 148

(56) References Cited

U.S. PATENT DOCUMENTS

| | | | |
|---|---|---|---|
| 3,689,695 | * | 9/1972 | Rosenfield et al. ................... 348/148 |
| 4,277,804 | * | 7/1981 | Robison ............................... 348/148 |
| 4,843,463 | * | 6/1989 | Michetti ............................... 348/148 |
| 5,027,200 | * | 6/1991 | Petrossian et al. ................... 348/118 |
| 5,530,421 | * | 6/1996 | Marshall et al. ...................... 340/436 |
| 5,574,443 | * | 11/1996 | Hsieh ................................... 340/901 |
| 5,680,123 | * | 10/1997 | Lee ...................................... 340/937 |
| 5,793,308 | * | 8/1998 | Rosinski et al. ...................... 340/903 |

\* cited by examiner

*Primary Examiner*—Edward Lefkowitz

(57) ABSTRACT

A blind spot viewing system for viewing the blind spot of a vehicle located to the passenger side of the vehicle towards the rear of the vehicle. The system includes a video camera adapted for mounting to the passenger side of the vehicle adjacent the rear of the vehicle. The video camera has a lens facing in an outwards direction from the passenger side of the vehicle to collect images of objects in the driver's passenger side blind spot. A video monitor is electrically connected to the video camera. The video monitor is designed for positioning in the passenger compartment of the vehicle to permit a driver of the vehicle to view images from the video monitor.

12 Claims, 6 Drawing Sheets

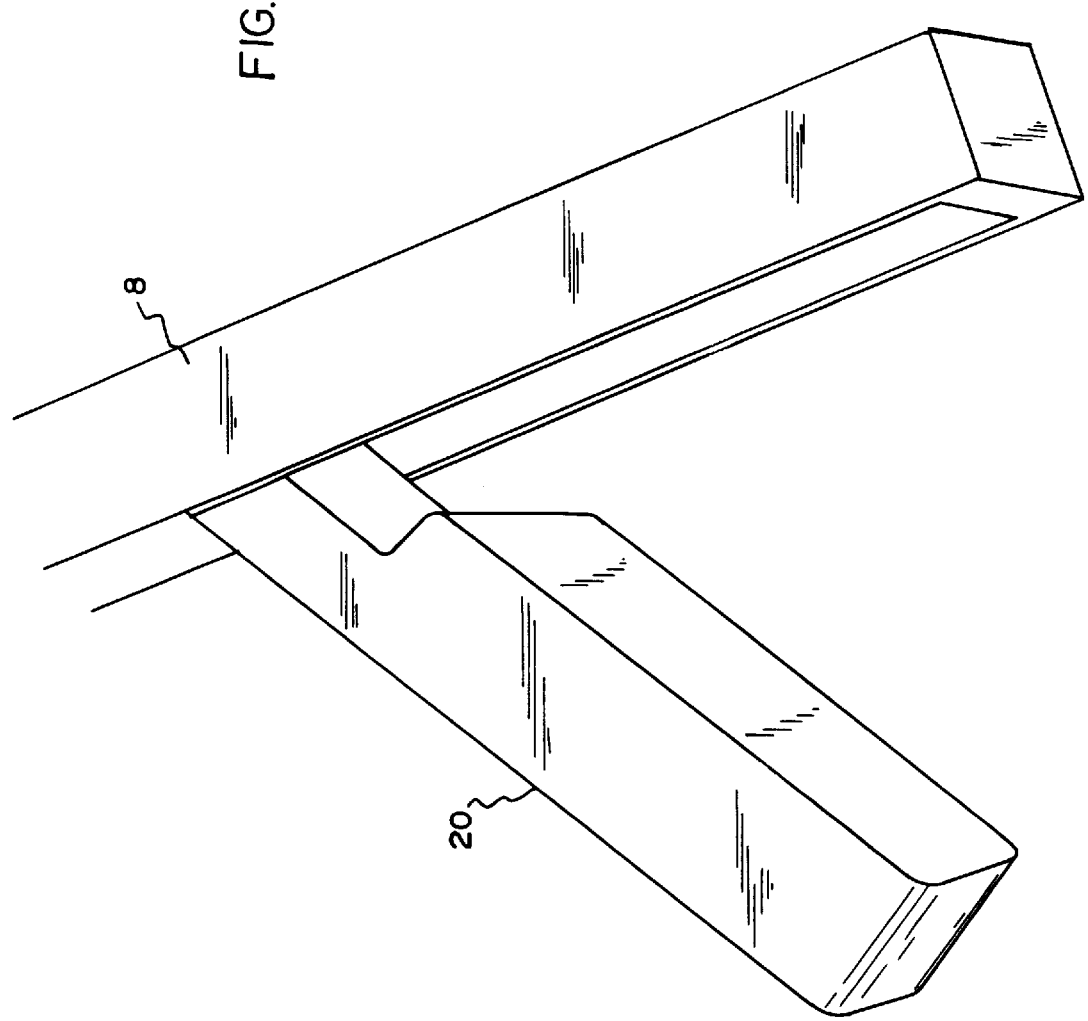

BLIND SPOT VIEWING SYSTEM

BACKGROUND OF THE INVENTION

1. Field of the Invention

The present invention relates to systems for viewing around a vehicle and more particularly pertains to a new blind spot viewing system for viewing the blind spot of a vehicle located to the passenger side of the vehicle towards the rear of the vehicle.

2. Description of the Prior Art

The use of systems for viewing around a vehicle is known in the prior art. More specifically, systems for viewing around a vehicle heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,530,421; U.S. Pat. No. 4,910,591; U.S. Pat. No. 4,214,266; U.S. Pat. No. 2,259,614; U.S. Pat. No. 5,684,474; and U.S. Pat. No. 3,689,695.

While these devices fulfill their respective, particular objectives and requirements, the aforementioned patents do not disclose a new blind spot viewing system. The inventive device includes a video camera adapted for mounting to the passenger side of the vehicle adjacent the rear of the vehicle. The video camera has a lens facing in an outwards direction from the passenger side of the vehicle to collect images of objects in the driver's passenger side blind spot. A video monitor is electrically connected to the video camera. The video monitor is designed for positioning in the passenger compartment of the vehicle to permit a driver of the vehicle to view images from the video monitor.

In these respects, the blind spot viewing system according to the present invention substantially departs from the conventional concepts and designs of the prior art, and in so doing provides an apparatus primarily developed for the purpose of viewing the blind spot of a vehicle located to the passenger side of the vehicle towards the rear of the vehicle.

SUMMARY OF THE INVENTION

In view of the foregoing disadvantages inherent in the known types of systems for viewing around a vehicle now present in the prior art, the present invention provides a new blind spot viewing system construction wherein the same can be utilized for viewing the blind spot of a vehicle located to the passenger side of the vehicle towards the rear of the vehicle.

The general purpose of the present invention, which will be described subsequently in greater detail, is to provide a new blind spot viewing system apparatus and method which has many of the advantages of the systems for viewing around a vehicle mentioned heretofore and many novel features that result in a new blind spot viewing system which is not anticipated, rendered obvious, suggested, or even implied by any of the prior art systems for viewing around a vehicle, either alone or in any combination thereof.

To attain this, the present invention generally comprises a video camera adapted for mounting to the passenger side of the vehicle adjacent the rear of the vehicle. The video camera has a lens facing in an outwards direction from the passenger side of the vehicle to collect images of objects in the driver's passenger side blind spot. A video monitor is electrically connected to the video camera. The video monitor is designed for positioning in the passenger compartment of the vehicle to permit a driver of the vehicle to view images from the video monitor.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new blind spot viewing system apparatus and method which has many of the advantages of the systems for viewing around a vehicle mentioned heretofore and many novel features that result in a new blind spot viewing system which is not anticipated, rendered obvious, suggested, or even implied by any of the prior art systems for viewing around a vehicle, either alone or in any combination thereof.

It is another object of the present invention to provide a new blind spot viewing system which may be easily and efficiently manufactured and marketed.

It is a further object of the present invention to provide a new blind spot viewing system which is of a durable and reliable construction.

An even further object of the present invention is to provide a new blind spot viewing system which is susceptible of a low cost of manufacture with regard to both materials and labor, and which accordingly is then susceptible of low prices of sale to the consuming public, thereby making such blind spot viewing system economically available to the buying public.

Still yet another object of the present invention is to provide a new blind spot viewing system which provides in the apparatuses and methods of the prior art some of the advantages thereof, while simultaneously overcoming some of the disadvantages normally associated therewith.

Still another object of the present invention is to provide a new blind spot viewing system for viewing the blind spot of a vehicle located to the passenger side of the vehicle towards the rear of the vehicle.

Yet another object of the present invention is to provide a new blind spot viewing system which includes a video camera adapted for mounting to the passenger side of the vehicle adjacent the rear of the vehicle. The video camera has a lens facing in an outwards direction from the passenger side of the vehicle to collect images of objects in the driver's passenger side blind spot. A video monitor is electrically connected to the video camera. The video monitor is designed for positioning in the passenger compartment of the vehicle to permit a driver of the vehicle to view images from the video monitor.

Still yet another object of the present invention is to provide a new blind spot viewing system that is mountable inside the passenger side rear turn signal and stop lamp assembly to view the driver's blind spot on the passenger side of the vehicle.

Even still another object of the present invention is to provide a new blind spot viewing system that allows a user to view the blind spot of the vehicle while driving forwards and backwards. This helps drivers to see any other oncoming vehicles on the passenger side of the vehicle so that the driver can turn without fear of hitting side hazards.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 13 is a schematic partial perspective view of a third preferred embodiment of the video monitor.

DESCRIPTION OF THE PREFERRED EMBODIMENT

Figure 1:
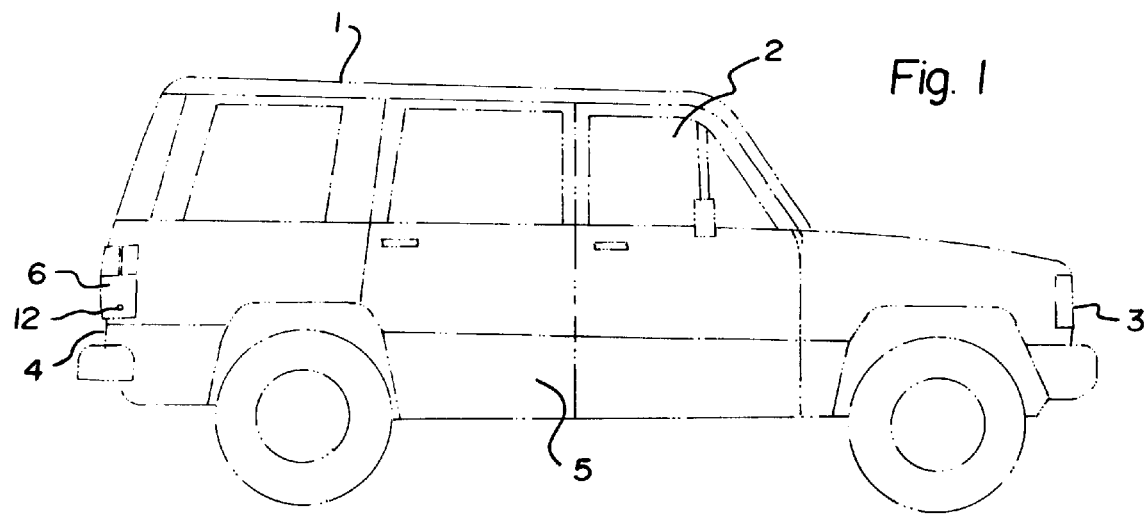
FIG. 1 is a schematic side view of a vehicle with a new blind spot viewing system according to the present invention.

With reference now to the drawings, and in particular to FIGS. 1 through 13 thereof, a new blind spot viewing system embodying the principles and concepts of the present invention will be described.

In use, the system is designed for permitting driver viewing a passenger side blind spot of a vehicle 1. The vehicle 1 has a passenger compartment 2, a front 3, a rear 4, a driver side, and a passenger side 5. The passenger compartment 2 of the vehicle I has a rear view mirror S. The rear 4 of the vehicle 1 has a pair of rear turn signal and stop lamp assemblies 6 with one rear turn signal and stop lamp assembly is positioned adjacent each side of the vehicle 1. Each rear turn signal and stop lamp assembly 6 has a lens portion 7 for permitting the passage of light therethrough. As best illustrated in FIGS. 1 through 13, the blind spot viewing system generally comprises a video camera 10 adapted for mounting to the passenger side 5 of the vehicle 1 adjacent the rear 4 of the vehicle 1. The video camera 10 has a lens 11 facing in an outwards direction from the passenger side 5 of the vehicle 1 to collect images of objects in the driver's passenger side blind spot. A video monitor 20 is electrically connected to the video camera 10. The video monitor 20 is designed for positioning in the passenger compartment 2 of the vehicle 1 to permit a driver of the vehicle 1 to view images from the video monitor 20.

Figure 3:
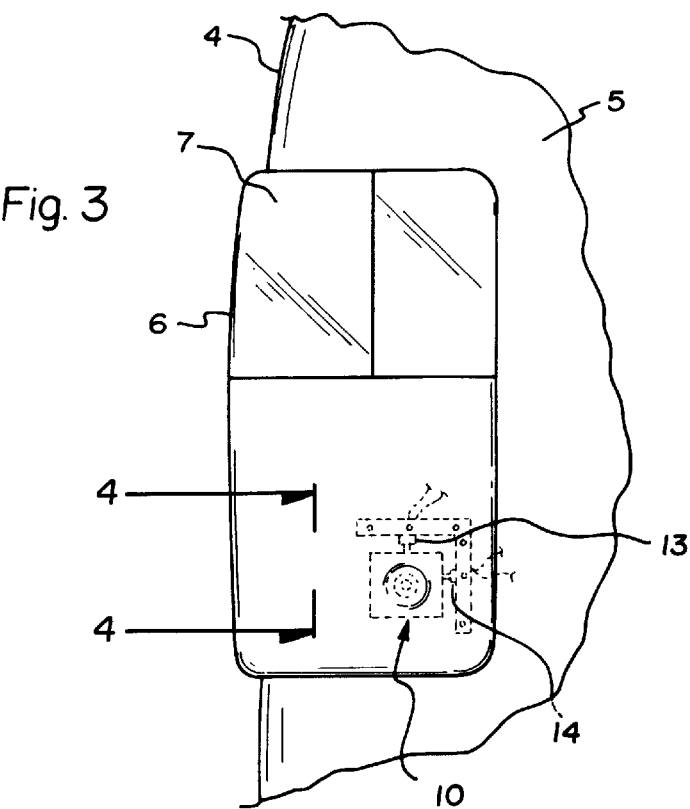
FIG. 3 is a schematic partial side view of the passenger side rear turn signal and stop lamp assembly region of a vehicle with of the present invention.
Figure 4:
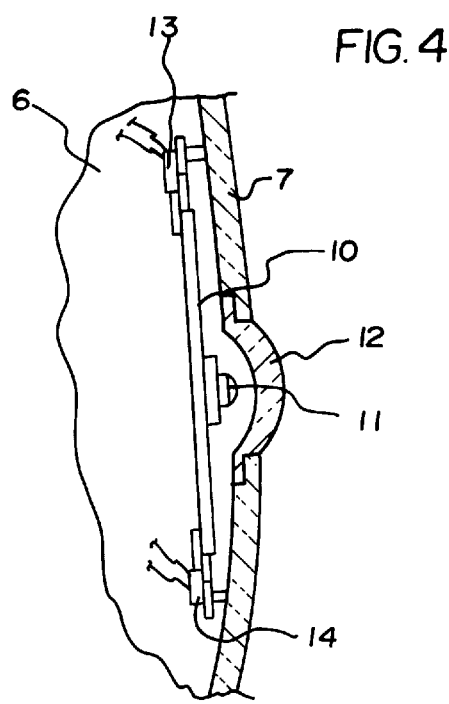
FIG. 4 is a schematic cross sectional view taken from line 4—4 on FIG. 3.
Figure 5:
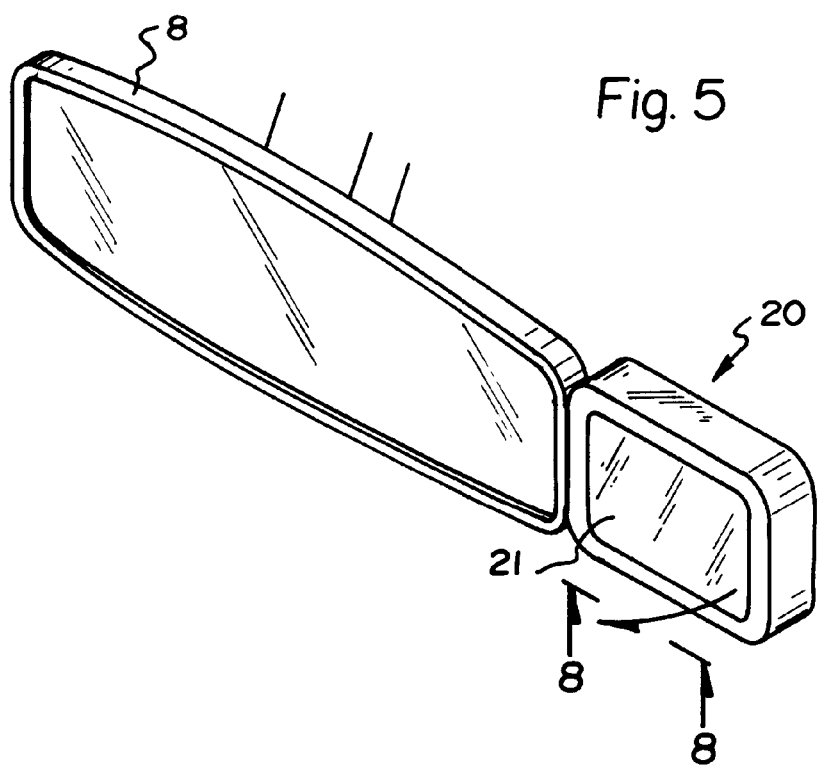
FIG. 5 is a schematic front perspective view of the video monitor of a preferred embodiment of the present invention attached to the rear view mirror of a vehicle.
Figure 6:
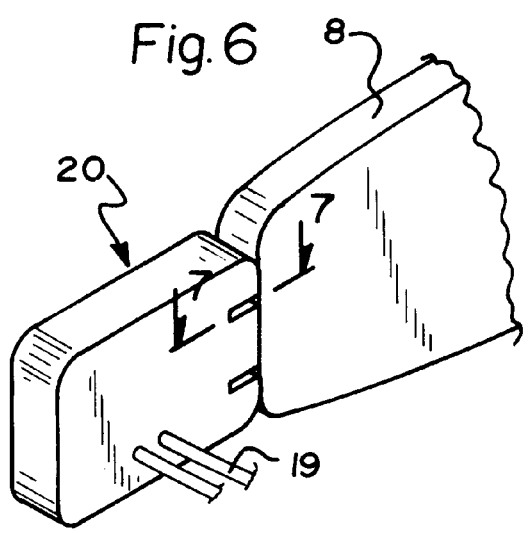
FIG. 6 is a schematic rear perspective view of the video monitor of the preferred embodiment of the present invention attached to the rear view mirror of a vehicle.
Figure 7:
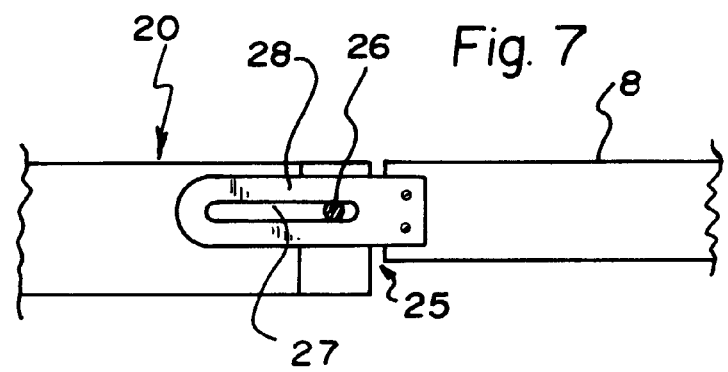
FIG. 7 is a schematic cross sectional view taken from line 7—7 on FIG. 6.

In closer detail, the system is electrically connectable to the power source of the vehicle 1 to provide power to the system. The video camera 10 (such as a small computer board camera) is provided for converting optical images to signals. The video camera 10 is designed for mounting to the passenger side 5 of the vehicle 1 adjacent the rear 4 of the vehicle 1. The video camera 10 has a lens 11 facing in an outwards direction from the passenger side 5 of the vehicle I such that the lens 11 of the video camera 10 collects images in a region extending in arc from the passenger side 5 of the vehicle 1 which includes the driver's passenger side blind spot. As illustrated in FIG. 3, the video camera 10 is designed for mounting in the passenger side rear turn signal and stop lamp assembly 6. In a preferred embodiment as shown in FIG. 4, the lens portion 7 of the passenger side rear turn signal and stop lamp assembly 6 has a hole on the passenger side 5 through which the lens 11 of the video camera 10 faces. The lens portion 7 of the passenger side rear turn signal and stop lamp assembly 6 in this preferred embodiment has a generally transparent window 12 covering the hole of the passenger side rear turn signal and stop lamp assembly 6. The window 12 has a generally hemispherical configuration.

Figure 2:
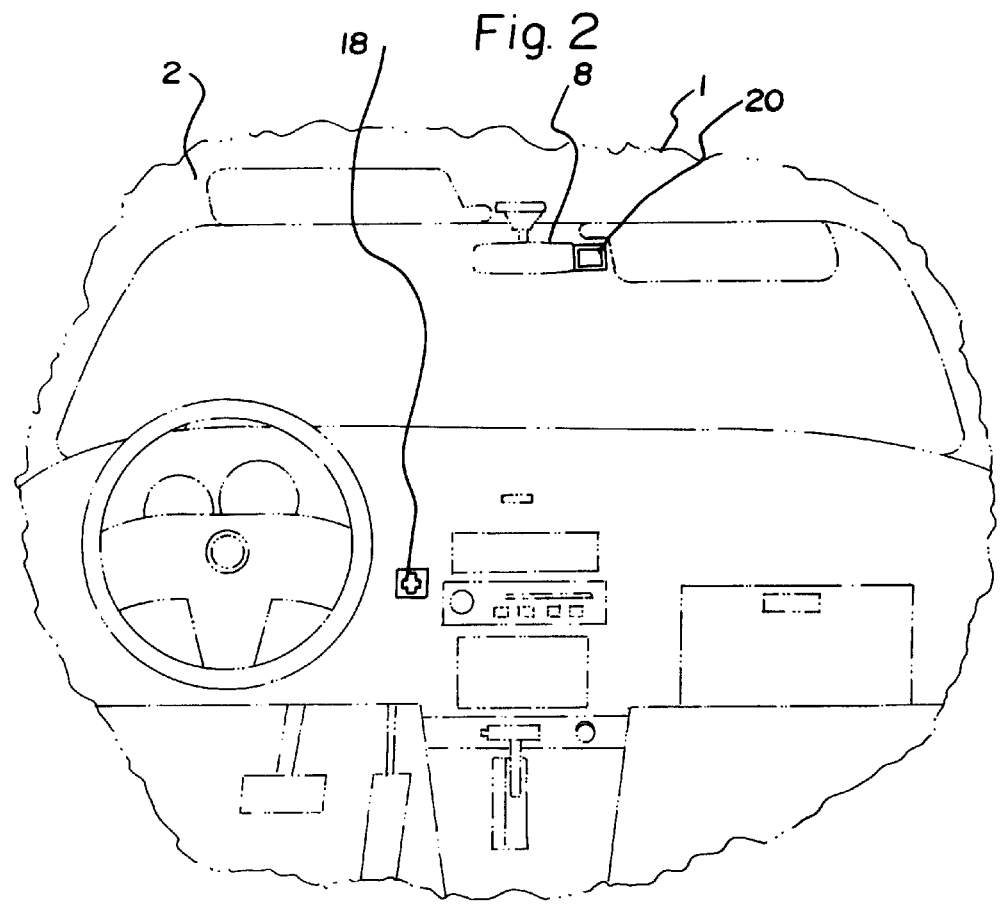
FIG. 2 is a schematic side view of the passenger compartment of a vehicle with of the present invention.
Figure 9:
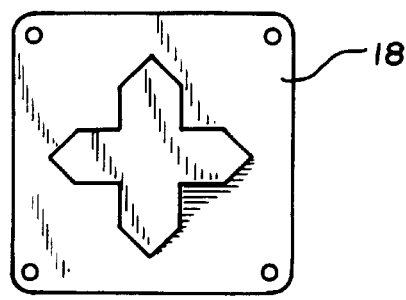
FIG. 9 is a schematic side view of the controller.
Figure 10:
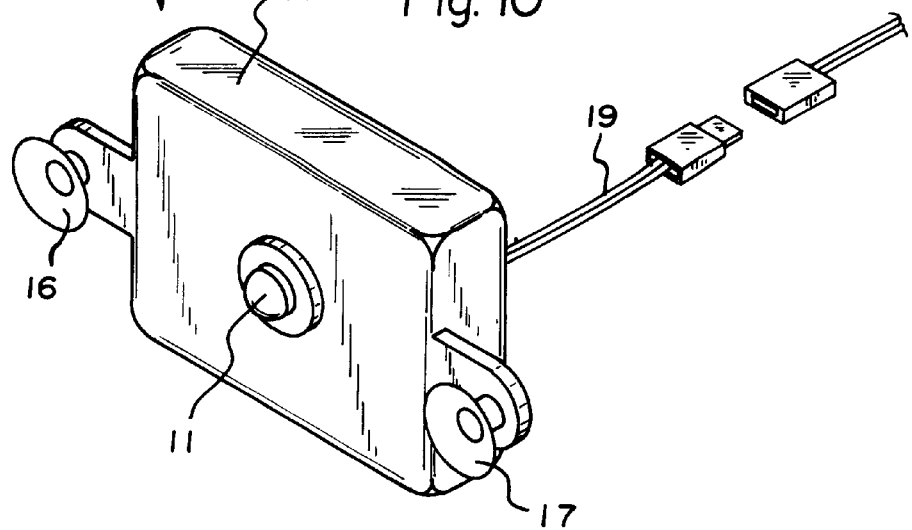
FIG. 10 is a schematic perspective view of another preferred embodiment of the video camera of the present invention.
Figure 11:
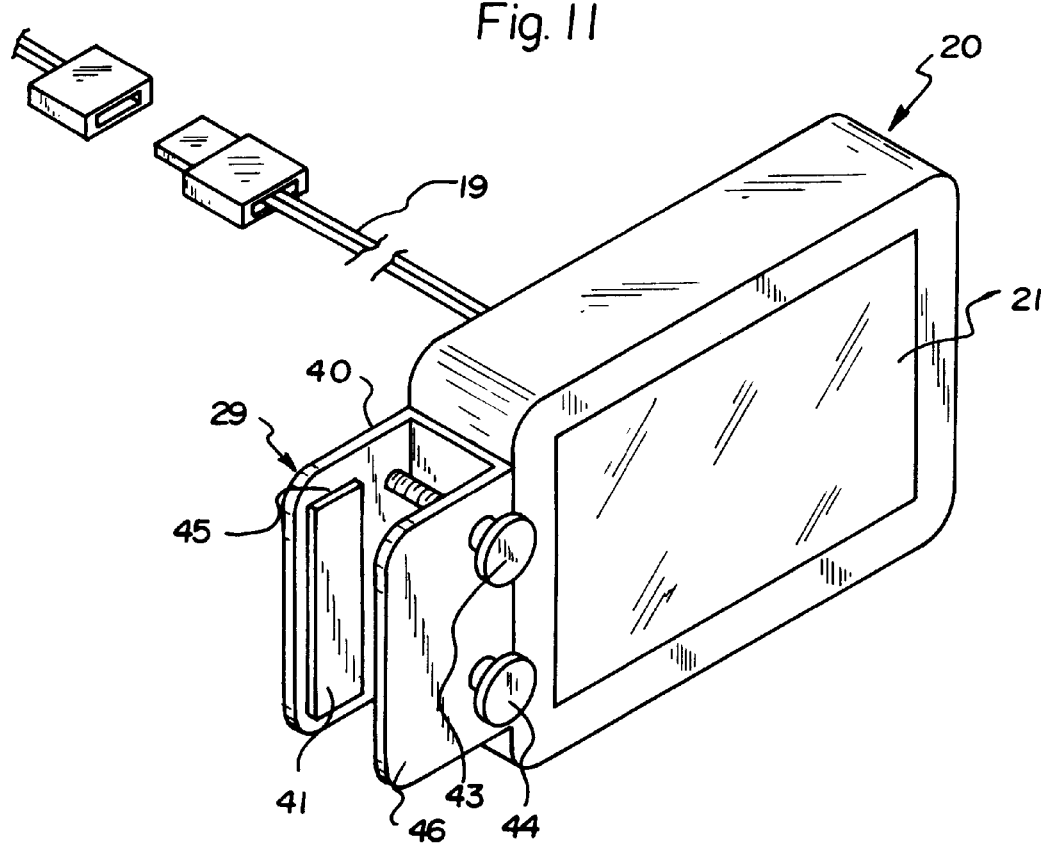
FIG. 11 is a schematic perspective view of another preferred embodiment of the video monitor.
Figure 12:
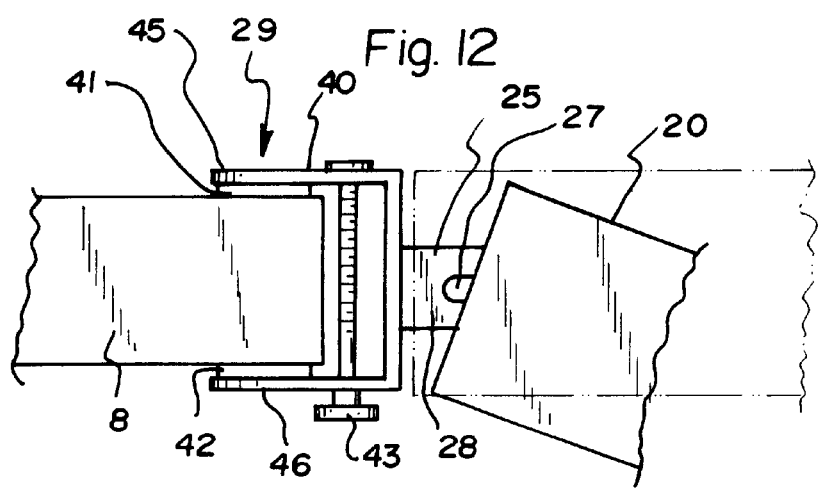
FIG. 12 is a schematic side view of the preferred embodiment of the video monitor of FIG. 11.

A device is preferably provided for pivoting the lens 11 of the video camera 10 in a horizontal plane about a vertical axis so that a driver may adjust the viewing angle of the video camera cover his or her particular passenger side blind spot. Preferably, a pair of servos 13,14 permit pivoting of the lens 11 of the video camera 10 in the horizontal plane. With reference to FIGS. 3 and 4, the servos 13,14 may be mounting directly inside the passenger side rear turn signal and stop lamp assembly 6 to permit pivoting of the lens 11 of the video camera 10 in the horizontal plane. In another preferred embodiment, as illustrated in FIG. 10, the video camera 10 is provided in a housing 15 adapted for mounting to the passenger side rear turn signal and stop lamp assembly 6 of the vehicle 1. The housing 15 has a generally rectangular configuration and a pair of suction cups 16,17 adapted for suctionally mounting the housing 15 to the lens portion 7 of the passenger side rear turn signal and stop lamp assembly 6. In this embodiment, the servos 13,14 are provided in the housing 15. With reference to FIG. 9, a controller 18 electrically connected to the device for remotely controlling pivoting of the video camera 10 by the device. In use, the controller 18 is designed for positioning in the passenger compartment 2 of the vehicle 1 such as on the dash or on the driver's door as illustrated in FIG. 2.

Figure 8:
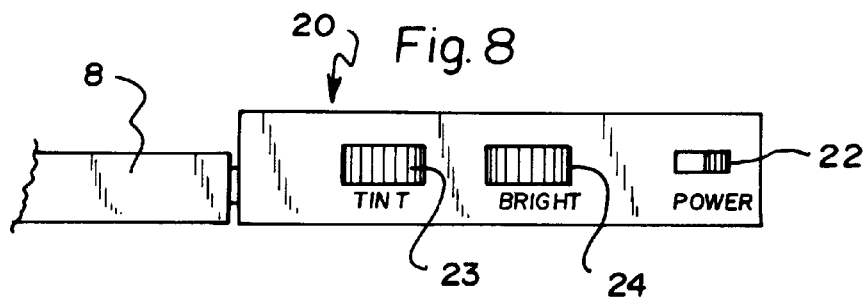
FIG. 8 is a schematic bottom side view of the video monitor of the present invention taken from the vantage of line 8—8 of FIG. 5.

The system also includes a video monitor 20 for converting signals to video images from the video camera 10. The video monitor 20 has a viewing screen 21 and preferably includes standard monitor 20 controls including controls for power 22, and tint 23 and brightness 24 of the displayed image as shown in FIG. 8. The video monitor 20 is electrically connected by electrical cables 19 to the video camera 10. The video monitor 20 is designed for positioning in the passenger compartment 2 of the vehicle 1 to permit a driver of the vehicle 1 to view images from the video monitor 20.

The video monitor 20 is preferably designed for pivotally mounting to the rear view mirror 8 of the vehicle 1 so that the driver can easily view his or her blind spot when checking the rear view mirror. In one preferred embodiment as illustrate in FIGS. 6 and 7, the video monitor is pivotally mounted to the rear view mirror by a pivot mount 25 comprising a pin 26 which extends from the video monitor 20 and is inserted into a slot 27 of a slotted member 28 extending from the rear view mirror 8 to permit pivoting and extension of the video monitor 20 with respect to the rear view mirror 8. In another preferred embodiment as shown in FIG. 13, the video monitor 20 may be integrally connected with the rear view mirror 8. In a third preferred embodiment, the video monitor 20 has a clamp 29 for attaching the video monitor 20 to the rear view mirror 8 of the vehicle 1. In this embodiment, the clamp 29 is pivotally coupled to the video monitor 20 to permit pivoting of the video monitor 20 with respect to the rear view mirror 8, the clamp 29 has a generally U-shaped bracket and a pair of rubber pads 41,42, and a pair of thumb screws 43,44 threadably extend through the arms 45,46 of the bracket. In use, tightening of the thumb screws 43,44 brings the arms 45,46 together to permit holding of the rear view mirror 8 therebetween, while loosening the thumb screws 43,44 relaxes the arms 45,46 so that the rear view mirror 8 can be released from between the arms 45,46.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A system for permitting driver viewing a passenger side blind spot of a vehicle, the vehicle having a passenger compartment, a front, a rear, a driver side, and a passenger side, the passenger compartment of the vehicle having a rear view mirror, the rear of the vehicle having a pair of rear turn signal and stop lamp assemblies, one rear turn signal and stop lamp assembly being positioned adjacent each side of the vehicle, each rear turn signal and stop lamp assembly having a lens portion for permitting the passage of light therethrough, said system comprising:

a video camera adapted for mounting to the passenger side of the vehicle adjacent the rear of the vehicle, said video camera having a lens facing in an outwards direction from the passenger side of the vehicle;

a video monitor being electrically connected to said video camera, said video monitor being adapted for positioning in the passenger compartment of the vehicle to permit a driver of the vehicle to view images from said video monitor; and wherein said video monitor is adapted for pivotally mounting to the rear view mirror of the vehicle, wherein a pivot mount comprises a pin extending from the video monitor and inserted into a slot of a slotted of a slotted member extending from the rear view mirror to permit pivoting and extension of said video monitor with respect to the rear view mirror, wherein said monitor is integral with the rear view mirror.

2. The system of claim 1, wherein said video camera is adapted for mounting in the passenger side rear turn signal and stop lamp assembly.

3. The system of claim 2, wherein the lens portion of the passenger side rear turn signal and stop lamp assembly has a hole through which said lens of said video camera faces.

4. The system of claim 3, wherein the lens portion of the passenger side rear turn signal and stop lamp assembly has a generally transparent window covering the hole of the passenger side rear turn signal and stop lamp assembly.

5. The system of claim 1, further comprising a device for pivoting said lens of said video camera in a horizontal plane about a vertical axis.

6. The system of claim 5, wherein a pair of servos permit pivoting of said lens of said video camera in said horizontal plane.

7. The system of claim 6, wherein said servos are adapted for mounting inside the passenger side rear turn signal and stop lamp assembly to permit pivoting of said lens of said video camera in said horizontal plane.

8. The system of claim 5, further comprising a controller for remotely controlling pivoting of said video camera by said device, said controller being adapted for positioning in the passenger compartment of the vehicle.

9. The system of claim 1, wherein said video camera is provided in a housing adapted for mounting to the passenger side rear turn signal and stop lamp assembly of the vehicle, said housing having a generally rectangular configuration and a pair of suction cups adapted for mounting said housing to the lens portion of the passenger side rear turn signal and stop lamp assembly.

10. The system of claim 1, wherein said video monitor has a clamp for attaching said video monitor to the rear view mirror of the vehicle, wherein said clamp is pivotally coupled to said video monitor to permit pivoting of said video monitor with respect to the rear view mirror.

11. A system for permitting driver viewing a passenger side blind spot of a vehicle, the vehicle having a passenger compartment, a front, a rear, a driver side, and a passenger side, the passenger compartment of the vehicle having a rear view mirror the rear of the vehicle having a pair of rear turn signal and stop lamp assemblies, one rear turn signal and stop lamp assembly being positioned adjacent each side of the vehicle, each rear turn signal and stop lamp assembly having a lens portion for permitting the passage of light therethrough, said system comprising:

a video camera for converting optical images to signals, said video camera being, adapted for mounting to the passenger side of the vehicle adjacent the rear of the vehicle, said video camera having a lens facing in an outwards direction from the passenger side of the vehicle Such that said lens of said video camera collects images in a region extending in an arc from the passenger side of the vehicle which includes the driver's passenger side blind spot;

said video camera being adapted for mounting in the passenger side rear turn signal and stop lamp assembly, the lens portion of the passenger side rear turn signal and stop lamp assembly having, a hole through which said lens of said video camera faces, the lens portion of the passenger side rear turn signal and stop lamp assembly having a generally transparent window covering the hole the passenger side rear turn signal and stop lamp assembly, the window having a generally hemispherical configuration;

a device for pivoting said lens of said video camera in a horizontal plane about a vertical axis, wherein a pair of servos permit pivoting of said lens of said video camera in said horizontal plane;

wherein said servos are adapted for mounting inside the passenger side rear turn signal and stop lamp assembly to permit pivoting of said lens of said video camera in said horizontal plane;

a controller for remotely controlling pivoting of said video camera by said device, said controller being adapted for positioning in the passenger compartment of the vehicle;

a video monitor, said video monitor being electrically connected to said video camera, said video monitor being adapted for positioning in the passenger compartment of the vehicle to permit a driver of the vehicle to view images from said video monitor; and said video monitor being adapted for pivotally mounting to the rear view mirror of the vehicle, wherein a pivot mount comprises a pin extending from the video monitor and inserted into a slot of a slotted of a slotted member extending from the rear view mirror to permit pivoting and extension of said video monitor with respect to the rear view mirror, wherein said monitor is integral with the rear view mirror, wherein said video monitor has a clamp for attaching said video monitor to the rear view mirror of the vehicle, wherein said clamp is pivotally coupled to said video monitor to permit pivoting of said video monitor with respect to the rear view mirror, said clamp having a generally U-shaped bracket and a pair of rubber pads a pair of thumb screws being threadably extended through arms of the bracket such that tightening of said thumb screws brings said arms together to permit holding of the rearview mirror therebetween and loosening said thumb screws relaxes said arms such that the rear view mirror can be released from between said arms.

12. A vehicle having a system for permitting driver viewing a passenger side blind spot of a vehicle, comprising:

a vehicle having a passenger compartment a fronts a rear, a driver side and a passenger side, the passenger compartment of the vehicle having a rear view mirror, the rear of the vehicle having a pair of rear turn signal and stop lamp assemblies, one rear turn signal and stop lamp assembly being positioned adjacent each side of the vehicle, each rear turn signal and stop lamp assembly having a lens portion for permitting the passage of light therethrough, said system comprising:

a video camera mounted on the passenger side of the vehicle adjacent the rear of the vehicle, said video camera having a lens facing, in an outwards direction from the passenger side of the vehicle, and a video monitor being electrically connected to said video camera, said video monitor being positioned in the passenger compartment of the vehicle to permit a driver of the vehicle to view images from said video monitor;

where in said video monitor is mounted to the rear view mirror of the vehicle in a manner such that a screen of the video monitor is located adjacent to a reflective surface of the rear view mirror for permitting viewing of the video monitor substantially simultaneous with viewing of the screen of the video monitor; and wherein the video monitor is pivotally mounted to the rear view mirror of the vehicle, wherein a pivot mount comprises a pin extending from the video monitor and inserted into a slot of a slotted member extending from the rear view mirror to permit pivoting and extension of said video monitor with respect to the rear view mirror, wherein said monitor is integral with the rear view mirror.

\* \* \* \* \*